(No Model.) 2 Sheets—Sheet 1.

G. M. PETERS & L. B. WALTON.
DASHER FOR VEHICLES.

No. 422,970. Patented Mar. 11, 1890.

WITNESSES
C. T. Bell
Jas. K. McGathran

INVENTORS.
G. M. Peters, and L. B. Walton.
by Herbert W. T. Jenner,
Attorney (No Model.) 2 Sheets—Sheet 2.
G. M. PETERS & L. B. WALTON.
DASHER FOR VEHICLES.
No. 422,970. Patented Mar. 11, 1890.
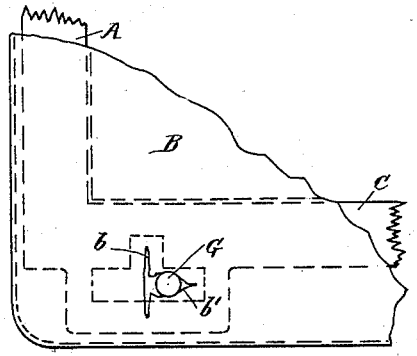
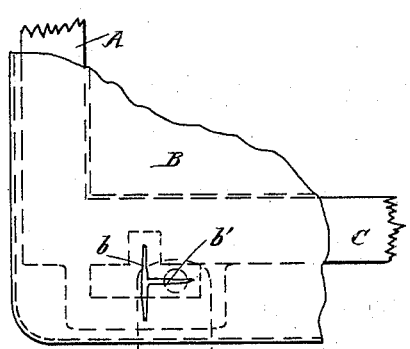
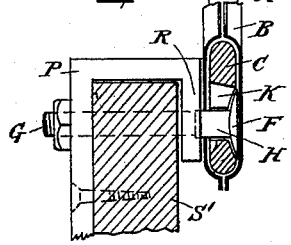
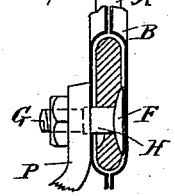
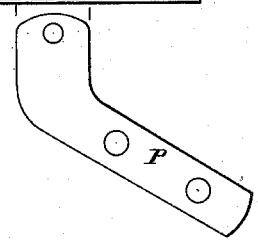
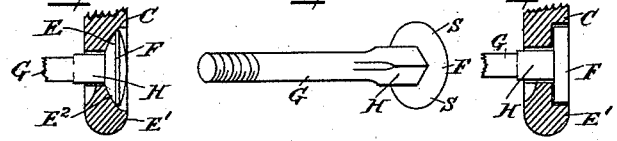
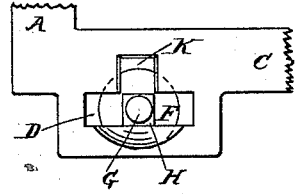
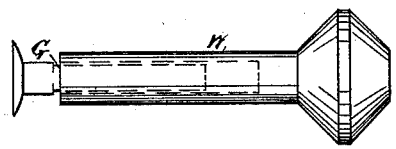
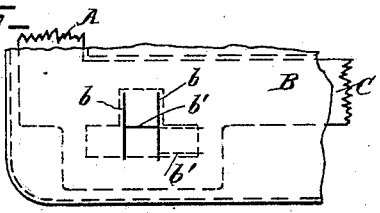
WITNESSES
C. T. Belt
Jas. R. McCathran
INVENTORS.
G. M. Peters and L. B. Walton
by Herbert W. T. Jenner
Attorney

UNITED STATES PATENT OFFICE.

GEORGE M. PETERS AND LUCIUS B. WALTON, OF COLUMBUS, OHIO, ASSIGNORS TO THE PETERS DASH COMPANY, OF SAME PLACE.

DASHER FOR VEHICLES.

SPECIFICATION forming part of Letters Patent No. 422,970, dated March 11, 1890.

Application filed December 10, 1888. Serial No. 293,231. (No model.)

*To all whom it may concern:*

Be it known that we, GEORGE M. PETERS and LUCIUS B. WALTON, citizens of the United States, and residents of the city of Columbus, in the county of Franklin and State of Ohio, have invented certain new and useful Improvements in Dashes, of which the following is a specification.

The several features of our invention and the various advantages arising from their use, conjointly or otherwise, will be apparent from the following description.

Figure 1:
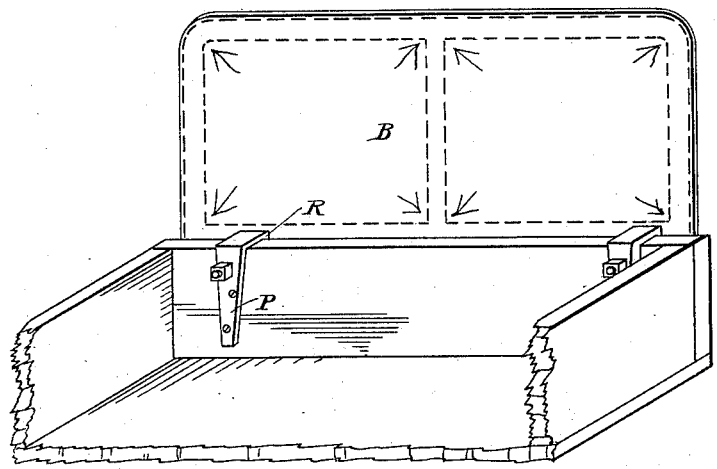
Figure 2:
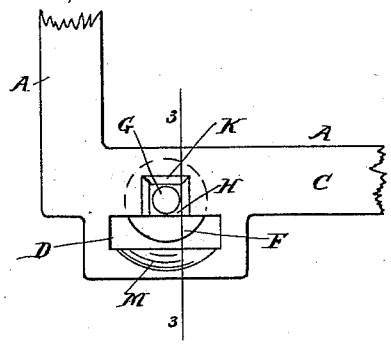
Figure 3:
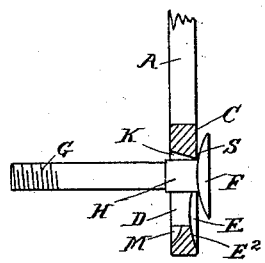
Figure 4:
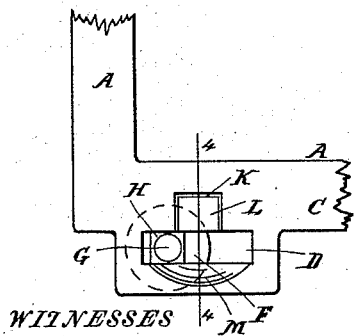
Figure 5:
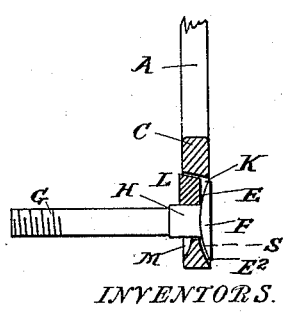

In the accompanying drawings, forming part of this specification, Figure 1 is a rear elevation of a dash attached to the forward part of a vehicle. Fig. 2 is a rear elevation of a corner of the dash-frame and bolt embodying our improvements and showing the shank of the said bolt in the upper notch or slot. Fig. 3 is a vertical transverse section of the parts shown in Fig. 2, the section being taken at the dotted line 3 3 of Fig. 2. Fig. 4 shows the same elevation as shown in Fig. 2, with the exception that the shank of the bolt is in the horizontal slot and to the left of the vertical notch or slot. Fig. 5 is a vertical transverse section of the parts shown in Fig. 4, said section being taken at the dotted line 4 4 of Fig. 4 and looking from right to left. Fig. 6 is a rear elevation of the same corner of the dash-frame, the latter being here shown as covered with leather, the leather having been cut and the bolt inserted according to our invention and located to one side of the vertical notch or recess in the dash-frame. Fig. 7 is a rear elevation of the lower corner of a dash, illustrating the preferred mode of cutting the dash-leather to admit the bolt and showing how the dash-foot will cover the incisions in the leather. Fig. 8 is an elevation of the bolt and the upper part of a foot of the description shown in Fig. 1, secured to the dash and vehicle-body, part of the dash and vehicle-body being shown in transverse section. Fig. 9 is an elevation of the bolt and of the upper portion of another description of foot secured to a dash, a part of the latter and a locking-key being shown in transverse section. Fig. 10 is a front elevation of the left-hand corner of a dash-frame and of the bolt and key. Fig. 11 is a view in perspective of the bolt. Figs. 12 and 13, in section, show modified forms of the bolt-head and of the recess, as E, of the dash-bar for receiving said bolt-head; and Fig. 14 is an elevation of a convenient handle for holding the bolt while the latter is being inserted. Fig. 15 is a rear elevation of the dash-corner, showing other modes of cutting the leather from the slots for the introduction of the bolt through the dash-bar.

It may be here remarked that as both the right-hand and the left-hand lower corners of the dash are alike, so far as our invention is concerned, the illustration of one corner is sufficient for both.

The principal features of our invention consist in a novel construction whereby the said bolt can be introduced into its proper position in the said dash-frame without harming the front leather of the dash and the said inserted bolt be securely locked in proper position in the dash.

In the accompanying drawings, A represents the dash-frame. In Fig. 1 the frame is indicated by dotted lines. B represents the leather covering the same.

C is the lower bar of the dash-frame, provided with longitudinal slot D, which may be in an enlargement of the lower bar, or in case of a wide bar be located in the bar itself. Above and below this slot the front sides of the bar G at and in the vicinity of said slot are provided with recesses E. These recesses E may be beveled, as shown at $E^2$ in Figs. 3, 5, 8, and 9, to receive the peripheral portion, or they may be formed as hereinafter mentioned. The main function of these recesses E is to receive the bolt-head, so that the latter shall not project beyond the front face or surface of the dash-bar C, and also that the bolt-head shall not rise out of place when its shank is directly beneath the cross-slot K, hereinafter mentioned.

In the inner portion of the bar C is cut a vertical slot K, at right angles to the longitudinal slot D. This slot K is just large enough to receive the square portion H of the bolt-head GF.

On the lower rear side of the dash-bar C a bevel M is formed, the bevel beginning in the slot K and extending rearwardly and downwardly. This bevel M is preferably concave, as shown, and proportioned to the size and shape of the peripheral bolt-head F.

We have provided the slot K and the bevel M for a purpose which we will hereinafter describe.

For enabling the bolt to be inserted in place in the dash and the foot to cover the opening in the dash-leather through which the head of the bolt is passed in its introduction into the dash we have devised the following incisions, viz: we make a vertical incision $b$ in the rear side of the leather of the dash. This vertical incision is at or near the center of the slot K and extends up or near the top of said slot and down preferably somewhat below the lower edge of the longitudinal slot D—viz., to the lower edge of the bevel M. A second incision $b'$ is now made at or about the vertical middle of slot $b$. This incision begins at the incision $b$. When the bolt is to be directly beneath the slot K, the incision $b'$ extends a short distance to the right and left of the incision $b$. Otherwise the incision $b'$ extends either to the right or to the left, according as the bolt is to be located somewhere in the right or left hand portion of the slot K.

When preferred, two vertical slots $b$ $b$ can be cut, as shown in Fig. 15, and the tongue of leather formed between them and the horizontal line can be lifted back or up, so that the bolt-shank could be laid in the cross-slot, and thus not be impeded by the leather in its passage through the dash-bar and turned back into place. A similar pair of parallel cuts can be made over the horizontal slot and in the right or left portion of said horizontal slot, and leaving a tongue of leather which can be lifted for the entrance of the bolt, and can be cut off if in the way of said shank. (See Fig. 15.)

The bolt-head is inserted as follows: The front surface of the peripheral edge is passed through the space or recess of the bevel M and shoved onward until the upper part of the peripheral portion S of the bolt-head F passes through the slot and on between the front leather of the dash and the front edge of the dash-frame, care being taken to guide the square shank H into the slot K. The peripheral bolt-head F will thus pass completely through the slot D, and the bolt can then be adjusted so that the length of its shank will be at right angles to the vertical face of the dash, the front surface of the bolt-head being parallel to or in line with the leather of the dash. The bolt-shank may now be lowered from the vertical slot K into the long horizontal slot D. The beveled face or portion S of the peripheral head F will now fit neatly into the bevel recess, as $E^2$, in the front of the frame of the dash-bar.

The bolt is conveniently inserted in position in the dash by an instrument, substantially such as that shown in Fig. 14, consisting of a suitable handle provided with a shank W. This shank has a recess (shown in dotted lines) which receives the screw-shank of the bolt, the depth of this recess being preferably such as not to receive all of the bolt-shank, but to compel such a portion of the said bolt-shank to be outside of the end of the inserting-tool as shall be equal to or a little more than the thickness of the dash-bar C at the point where the bolt is inserted. Should the position required for this bolt, in reference to the slot B and the point where the said bolt is attached to the vehicle, cause the bolt to lie directly beneath the slot K, a square piece of material may be placed in the vertical slot K, as a key or locking device L, to prevent the bolt from rising in place, although as soon as the bolt is locked in position, by being screwed tightly to the vehicle, the bevel portion S of the peripheral head entering the bevel recesses $E^2$ will prevent the bolt from rising out of its place, and the key will be unnecessary. The top and sides of the vertical slot K are preferably beveled, as shown, to the more readily enable the key L, when desired, to be placed therein and to be wedged securely in position.

When the bolt is in place, it is behind the front leather of the dash, and is thereby concealed from view. The leather being duly folded back as far as may be upon the bolt after the bolt has been put into proper place, the dash is then by means of the bolt secured directly to the body of the vehicle or to a dash-foot or equivalent support connected to the vehicle.

Any of the various descriptions of dash-feet may be used. In the present instance one form of foot N is shown provided with a rear brace or leg P and a small front lip or brace R, passing on the outside of the body of the vehicle, while the brace P passes on the inside, the wooden portion S' of the vehicle being fitted tightly between the said lip and brace. The shank G of the bolt GF passes through the dash, as described, and through the square openings in the lip R, then through the wood U of the body, thence through the opening in the brace or leg P of the foot, a part of the square portion of the shank entering the square opening of the lip R. A nut T, screwed on the rear of the brace P, tightly joins the dash and the foot and the wooden portion of the vehicle together and holds the dash in position on the vehicle.

In Fig. 9 the top of a more simple form of foot P is shown, a portion of the square shank H of the bolt being present in and fitting closely a square hole in the foot. Where the dash is bolted directly to the vehicle-body, this square shank enters a square opening in the latter. The square portion of the bolt fitting a square hole in the foot or vehicle, as aforementioned, the better prevents the bolt, especially when directly beneath the slot K, from turning, and thus unscrewing the nut G and allowing the bolt-head F to slip out of the bevels and its shank to enter the slot K, the dash at the same time descending out of place.

We have herein described the preferred form of bolt-head and of the recesses M. These recesses may, however, be beveled at the back, as at E², and have the straight rim or edge E', (see Fig. 12,) or be without a bevel at the back and have the straight rim or edge E', (see Fig. 13,) and the bolt may have a square head and have a straight edge. These forms will prevent the bolt-head, after being bolted in position, from rising out of its place when opposite the cross-slot K to the vehicle or foot, and the square head will prevent turning. Where the recess E consists of a simple bevel, as shown in Figs. 3, 5, 8, and 9, the bolt is necessarily provided with a bevel at S to prevent its slipping out of place when bolted in position directly beneath the cross-slot K, the key L being altogether omitted, as will usually be the case. Where the bolt-head is also square or straight-sided in end elevation, the straight-sided portion H of the shank may obviously be omitted. Ordinarily the foot where it is connected to the dash is nearly three times as wide as the square portion of the shank G of the bolt. Therefore the shank G can be pushed one side or the other in the slot D to a considerable distance to the right or left of the incision $b$ and along the incision $b'$, and the foot will still hide these incisions.

One of the great advantages of our invention is in the fact that dashes can be transported without the bolt being placed within the dash at the time when the leather is sewed thereon, and the bolts can be easily applied to and placed in the dash-frames at the place where the dash-frame is applied to the vehicle without marring the leather of the dash, and at the same time that they hold the dash in place also themselves be securely held in position. In this manner we are enabled to ship a large number of dashes in a very compact form without the bolts being present in the dash and sticking out therefrom and scratching the leather of the adjacent dashes. We are thus enabled to pack our dashes closely together to save the expense of freight and to preserve the face of the leather of the dash uninjured.

We are aware that heretofore an attempt has been made to provide a bolt which may be introduced through the longitudinal slot or its equivalent hole in the dash by forming the bolt-head narrow, so that it will pass through the slot or hole and then be turned so that the length of the head will bear against the sides of the slot. This method of attempting to carry out the purposes of our invention is not successful for the reason that the nut whereby the bolt is screwed to the vehicle often becomes loose, and, the bolt turning, the bolt slips back through the longitudinal slot, and the dash is thereby free to fall from the vehicle. Our invention obviates all such disadvantages and provides a bolt which in any case cannot become disconnected from the dash excepting by intentional human agency.

While the various features of our invention are preferably used together, one or more of them may be used without the remainder, and in so far as applicable one or more of said features may be used in conjunction with dashes, vehicles, or feet other than those of the specific shape hereinbefore set forth.

What we claim as new, and desire to secure by Letters Patent, is—

1. The combination of the bolt provided with head F and the dash-frame having slot D, having recesses E E, and a slot or recess having a direction at right angles to the slot D and communicating therewith, substantially as and for the purposes specified.

2. The combination of the bolt provided with head F and the dash-frame having slot D, having recesses E E, and a vertical slot or recess K at one side of the longitudinal slot D and communicating therewith and with the bevel M on the inner face of the dash-rail at the edge of slot D opposite to the slot K, substantially as and for the purposes specified.

3. The combination of the bolt provided with circular head F, having peripheral bevel, and the dash-frame having slot D, having beveled recesses E' E', and a slot or recess having a direction at right angles to the slot D and communicating therewith, substantially as and for the purposes specified.

4. In combination with a dash-rail C, provided with front bevels E², adjoining the longitudinal slot D, and the vertical slot K on one side of the longitudinal slot D, and with the bevel M on the inner face of the dash-rail at the edge of the slot D opposite to the slot K, the bolt GF, having discal head F, provided with the peripheral bevel S, substantially as and for the purposes specified.

5. The combination of the dash-rail C, provided with longitudinal slot D, the rail being beveled at E² above and below the slot, and the vertical slot K on one side of the longitudinal slot D and communicating therewith, the rail having the bevel M on its inner face at the edge of the slot D opposite to the slot K, and the bolt GF, having a discal head F, provided with a peripheral bevel S and having square shank H, of a size to be received in the slot K, substantially as and for the purposes specified.

6. In a leather-covered dash, the combination of the dash-rail C, provided with slot D and recesses E E, and vertical slot K, communicating with slot D, and the leather having incisions $b$ $b'$, substantially as and for the purposes specified.

7. The combination of a dash-rail provided with slot D and recesses E E, vertical slot K, opening into the side of slot D, the edge of slot D opposite slot K being provided with bevel M, bolt GF, and the dash-leather provided with the vertical incision or incisions $b$ and the horizontal incision or incisions $b'$, located as described, substantially as and for the purposes specified.

8. The combination of a dash-rail C, provided with slot D, having the beveled recesses E E, and the vertical slot K at one side of the longitudinal slot D, and with the bevel M on the inner face of the dash-rail at the edge of the slot D opposite to the slot K, the square bolt GF, having a discal head F, provided with peripheral bevels S and having square shank H, of a size to be received in the slot K, the inner edge of the face of the leather provided with vertical incision or incisions $b$ and the horizontal incision or incisions $b'$, located as described, and bolt and foot or vehicle body, substantially as and for the purposes specified.

9. As a new article of manufacture, a dash consisting of a metal frame surrounded by a leather cover, the metallic rail having the horizontal longitudinal slot and the vertical slot joined to the horizontal slot at right angles therewith, and the leather cover having the vertical incision $b$, coincident for at least a part of its length with the vertical slot, and also the horizontal incision $b'$ in conjunction with the said horizontal slot of the dash-frame, substantially as and for the purposes specified.

GEORGE M. PETERS.
LUCIUS B. WALTON.

Attest:
CHARLES M. PETERS,
W. A. MILES.